US012789807B2

(12) United States Patent
Gyurko et al.

(10) Patent No.: US 12,789,807 B2
(45) Date of Patent: Nov. 10, 2026

(54) METHOD FOR CONTROLLING A VEHICLE

(71) Applicant: Knorr-Bremse Systeme für Nutzfahrzeuge GmbH, Munich (DE)

(72) Inventors: Zoltan Gyurko, Hahot (HU); Huba Nemeth, Budapest (HU); Kornel Straub, Pomáz (HU); Örs Sinka, Kecskemét (HU); Nora Meszaros, Gencsapáti (HU)

(73) Assignee: Knorr-Bremse Systeme für Nutzfahrzeuge GmbH, Munich (DE)

( * ) Notice: Subject to any disclaimer, the term of this patent is extended or adjusted under 35 U.S.C. 154(b) by 13 days.

(21) Appl. No.: 18/873,487

(22) PCT Filed: Jun. 5, 2023

(86) PCT No.: PCT/EP2023/064967
§ 371 (c)(1),
(2) Date: Dec. 10, 2024

(87) PCT Pub. No.: WO2023/237479
PCT Pub. Date: Dec. 14, 2023

(65) Prior Publication Data

US 2025/0353497 A1 Nov. 20, 2025

(30) Foreign Application Priority Data

Jun. 10, 2022 (EP) .................................... 22178330

(51) Int. Cl.
*B60W 10/04* (2006.01)
*B60W 10/18* (2012.01)
*B60W 30/16* (2020.01)
*B60W 30/18* (2012.01)
*B60W 50/14* (2020.01)

(52) U.S. Cl.
CPC .......... *B60W 30/162* (2013.01); *B60W 10/04* (2013.01); *B60W 10/18* (2013.01); *B60W 30/18127* (2013.01); *B60W 50/14* (2013.01); *B60W 2520/10* (2013.01); *B60W 2540/10* (2013.01); *B60W 2540/12* (2013.01); *B60W 2554/402* (2020.02);
(Continued)

(58) Field of Classification Search
CPC .... B60W 30/162; B60W 10/04; B60W 10/18; B60W 50/14
See application file for complete search history.

(56) References Cited

U.S. PATENT DOCUMENTS

| | | | |
|---|---|---|---|
| 9,308,914 | B1 | 4/2016 | Sun et al. |
| 2019/0210604 | A1 | 7/2019 | Limbacher |

(Continued)

FOREIGN PATENT DOCUMENTS

| | | | |
|---|---|---|---|
| DE | 102016008363 | A1 | 1/2018 |
| EP | 3584135 | A1 | 12/2019 |
| WO | 2019201555 | A1 | 10/2019 |

*Primary Examiner* — Tan Q Nguyen

(57) ABSTRACT

Devices and method for controlling a vehicle is disclosed. The methods can include receiving at least one environment-related information from an environment-related source, receiving a driver input from a driver input interface, generating a target parameter for controlling the longitudinal movement according to the environment-related information, and providing the target parameter if the driver input fulfils a predetermined input condition.

18 Claims, 3 Drawing Sheets

(52) U.S. Cl.
CPC . *B60W 2554/4041* (2020.02); *B60W 2710/18* (2013.01); *B60W 2720/106* (2013.01); *B60W 2754/30* (2020.02)

(56) References Cited

U.S. PATENT DOCUMENTS

| | | | | |
|---|---|---|---|---|
| 2020/0254983 | A1* | 8/2020 | Suzuki | B60T 1/10 |
| 2021/0018930 | A1* | 1/2021 | Herbach | G05D 1/10 |
| 2021/0163000 | A1 | 6/2021 | Dieckmann et al. | |
| 2022/0032883 | A1* | 2/2022 | Ito | B60T 7/12 |
| 2022/0105925 | A1* | 4/2022 | Naserian | B60W 10/184 |
| 2023/0068356 | A1* | 3/2023 | Aggoune | G01C 21/3697 |

* cited by examiner

METHOD FOR CONTROLLING A VEHICLE

CROSS-REFERENCE TO RELATED APPLICATIONS

This is a national stage application claiming priority to international patent application Serial No. PCT/EP2023/064967, filed Jun. 5, 2023, which is hereby incorporated by reference in its entirety.

The present invention relates to a method for controlling a vehicle, a device, a vehicle, a computer program product and a storage device for carrying out the method.

One main aspect in vehicle development is to reduce the workload of a driver while driving a vehicle. To reduce the workload, it is essential that driver tasks can be taken over by the vehicle. One main driver task is the adjusting of the longitudinal movement of the vehicle in reaction to environment-related information. For example, after recognizing an end of a traffic jam the vehicle is heading to, the driver has to control the approaching of the vehicle to the end of the traffic jam in a safe way. Another example for such a task is after recognizing a dynamic object in front of the vehicle to control the longitudinal movement of the vehicle for adjusting a safe distance between the vehicle and the object.

Therefore, as an object of the invention, to reduce the workload of the driver, such tasks shall be continued by the vehicle itself. However, since the driver controls the vehicle at the beginning of such a task, it is a further object of the invention that the handover of such task shall be initiated by the driver for himself.

This object is achieved by the subject-matters of the independent claims. Advantageous embodiments are shown by the subject-matters of the dependent claims.

According to the invention, a method for controlling a vehicle, in particular a longitudinal movement of the vehicle, is provided, wherein the method comprises the following steps:

- receiving at least one environment-related information from an environment-related source;
- receiving a driver input from a driver input interface;
- generating a target parameter for controlling the longitudinal movement according to the environment-related information; and
- providing the target parameter if the driver input fulfils a predetermined input condition.

In the step of generating the target parameter, a determination or a calculation of the target parameter is carried out, wherein at the end the target parameter is available but not yet sent to other systems or devices which may use the target parameter for controlling the longitudinal movement of the vehicle. The step of providing the target parameter may comprise the sending of the target parameter to at least one of the other systems or devices which may use the target parameter for controlling the longitudinal movement of the vehicle. That means, the longitudinal movement of the vehicle is controlled by providing a target parameter.

The target parameter may be transferred to at least one vehicle control unit configured to control the movement of the vehicle.

The target parameter may be a constant value or a set of values, which is time-based and/or distance-based and/or velocity-based. That means, if the environment-related information contains information about an object the vehicle is approaching, the target parameter can be generated based on the distance between the vehicle and the object and/or based on the time the vehicle needs to reach the object and/or based on the velocity of the vehicle and/or of the object. That means the target parameter may be adjusted according to the distance the vehicle covers while approaching the object or the target parameter may be adjusted according to the time that goes by while approaching the object.

The generation of the target parameter may be carried out permanently or from the point of time the predetermined input condition is fulfilled. Further, it is also possible that the target parameter is only generated once, namely when the predetermined input condition is fulfilled.

According to one aspect of the invention, the target parameter is generated by an accelerator pedal unit and/or according to an accelerator pedal position. Preferably, the predetermined input condition is a release of the accelerator pedal.

Further preferably, the method is carried out during a one-pedal-drive mode of the vehicle, wherein the vehicle movement is controlled by the driver only according to the accelerator pedal input. The one-pedal-drive mode may be realized by using an electric propulsion system, which recuperates or dissipates kinetic energy and/or by using a hydraulic retarder for dissipating kinetic energy.

Preferably, the target parameter comprises a target vehicle acceleration or a target vehicle deceleration and/or a target vehicle speed and/or a target propulsion torque or force or a target deceleration torque or force.

Preferably, the environment-related information comprises information about at least one object the vehicle approaches.

Further preferably, a recognition step of the at least one object and/or of a movement of the at least one object is carried out and/or a classification step of the at least one object is carried out. The recognition step may comprise the detection of an object the vehicle is approaching. The recognition step of the movement of the object may comprise the detection of the position and the velocity of the object and if the object moves, the direction in which the object moves. Preferably, each of these steps are carried out by the vehicle or by vehicle systems configured for environment recognition. In particular, the vehicle may comprise one or more units configured to carry out these steps. Such unit may be connected to environment detection means or comprise environment detection means as they are described later.

In particular, the at least one object may comprise a road crossing or a pedestrian crossing, a stop or a yield sign, traffic lights, another vehicle, other traffic participants as pedestrians, a speed limit, a tight curve or a steep portion of a road. Further, the object may comprise a static object that does not move or a dynamic object in particular moving towards or away from the vehicle. This is a not-limited list of classes for a classification step that can be carried out. Preferably, the driver can make a setting by choosing to which classes the method shall be applied.

Preferably, the target parameter is generated in such a way that a distance and/or a speed between the vehicle and the object is adjusted.

In the following, some situation examples are shown defining tasks to be solved by the invention. Neither the examples are intended to limit the invention nor must the invention deal with all of the following situation examples:

EXAMPLE 1

Situation: Approaching a road crossing with stop sign or red traffic light.

Task: Decelerate to standstill to the position of the stop sign or light.

EXAMPLE 2

Situation: Approaching a road crossing with or without (equal priority roads) a yield sign (including roundabout).

Task: decelerate to a speed where the priority of another vehicle can be given.

EXAMPLE 3

Situation: Approaching a pedestrian crossing where pedestrians are next to or on it.

Task: decelerate to standstill to the pedestrian crossing.

EXAMPLE 4

Situation: Approaching a lower speed limit than the current (including speed limit sign or city limit).

Task: decelerate to that limit to the position of the sign.

EXAMPLE 5

Situation: Approaching a tight curve.

Task: decelerate being able to drive with a safe speed in that curve.

EXAMPLE 6

Situation: Approaching a static object.

Task: decelerate to a safe stop distance.

EXAMPLE 7

Situation: Approaching a dynamic object (vehicle, pedestrian, bicycle).

Task: decelerate to the speed of the slower object.

According to some of the examples above, the target parameter is generated to adjust a distance and/or a speed between the vehicle and the object. If the vehicle follows another vehicle with lower speed, the target parameter allows controlling of the movement of the vehicle, to adjust the distance and/or speed between both vehicles. According to one aspect of the invention, while driving actively by using the accelerator pedal the driver allows providing the target parameter by releasing the accelerator pedal (that means, in this case, releasing the accelerator pedal corresponds to the predetermined input condition) or by tapping the brake pedal (that means, in this case, tapping the brake pedal corresponds to the predetermined input condition). For example, if the driver recognizes an object in the environment in front of the vehicle, for example another vehicle he wants to follow, the driver allows the providing of the target parameter, wherein the target parameter is generated to adjust the distance and the relative speed between both vehicles, since the movement information (speed and distance) and the class of the object (another vehicle) is provided to the method according to the invention. If both vehicles are commercial vehicles, the target parameter may be generated such that the vehicle approaches the other vehicle to adjust a distance and relative speed between both for platooning.

Preferably, the method comprises a further step, wherein controlling of the longitudinal movement of the vehicle according to the target parameter is carried out by using at least one movement control system of the vehicle. According to this aspect, the target parameter is used for controlling the movement control system. The at least one movement control system may comprise a deceleration system, in particular a brake system, a retarder, a recuperative deceleration system, and/or a propulsion system. The brake system may comprise a frictional brake system, in particular an electronic brake system. The retarder may be configured as a hydraulic retarder or may comprise an electric brake resistor in combination with an electric motor, which is used to decelerate the vehicle. The electric motor may additionally or alternatively be combined with an electric energy storage to form a recuperative deceleration system. The propulsion system may comprise an internal combustion engine like a fuel or diesel engine and/or an electric motor. Further, a hydrogen-based propulsion system may be provided as well.

Preferably, the driver input interface comprises a brake pedal, wherein the predetermined input condition is a predetermined brake pedal input. In particular, the predetermined brake pedal input may be a tapping on the brake pedal by the driver, wherein preferably, no deceleration effect is applied to the vehicle.

Additionally or alternatively, the driver input interface comprises an accelerator pedal, wherein the predetermined input condition is a predetermined accelerator pedal input, preferably an input of 0% that means a full releasing of the accelerator pedal. According to another aspect, the predetermined input condition is a predetermined accelerator pedal input between 0% accelerator pedal input and an accelerator pedal input smaller than the maximum accelerator pedal input. According to this aspect, there is no need to full releasing the accelerator pedal to allow the providing of the target parameter earlier.

Additionally or alternatively, the driver input interface comprises an input device, in particular with a button, a switch or a lever, preferably a retarder lever, wherein the predetermined input condition is a predetermined input via this input device. According to one aspect, the driver may allow providing the target parameter by actively switching the input device into a certain switching state.

Preferably, the environment-related source comprises environment detection means, in particular at least one sensor and/or at least one receiver. The sensor may comprise a radar sensor and/or a LiDAR sensor and/or may comprise an optical sensor, for example a camera. A receiver may for example comprise a GPS-receiver configured to receive data to determine the position of the vehicle.

Additionally or alternatively, the environment-related source comprises stored environment data. The data may comprise digital map data, which are used by navigation systems of the vehicle. In particular, the stored environment data may be used alternatively or additionally to the environment detection means. For example, if the environment detection means does not detect any object (for example a pedestrian crossing, a road crossing or a steep curve), these objects may be provided from the stored environment data.

Preferably, the method comprises a further step, wherein a control parameter from a control parameter source is received, wherein the method is carried out according to the control parameter. Preferably, the control parameter comprises an activation parameter or a vehicle status information, preferably a status information from the at least one control system. In particular, the control parameter may comprise the predetermined input condition, which can be adjusted by the driver via the control parameter source. Preferably, the control parameter source is part of a human machine interface (HMI), for example comprising a display or switches, the driver may use to adjust the predetermined input condition. Advantageously, if the driver does not want the carrying out of the functionality of the invention in the vehicle, he may deactivate the functionality by using the control parameter source.

Preferably, the method comprises a further step, wherein a stop control parameter from a stop control parameter source is received, wherein at least carrying out the step of providing the target parameter is interrupted or set to a non-influence state to the at least one movement control system. The stop control parameter source may comprise a deceleration monitoring unit configured to monitoring the deceleration of the vehicle during carrying out the method according to the invention. If the deceleration of the vehicle according to the target parameter is too low to reach a safe state or if the movement control system using the target parameter cannot apply a deceleration to the vehicle to reach a safe state, another movement control system, for example comprising a driver assistant system like AEBS, may over-take the movement control of the vehicle or at least the generation of the target parameter.

According to a further aspect, the stop control parameter source may comprise a driver input interface, for example, the accelerator pedal and/or the brake pedal are/is part of the driver input interface, wherein carrying out the method is stopped when the driver uses the driver input interface. For example, if the driver wants to decelerate more compared to the deceleration reached according to the target parameter or allowed by the target parameter due to a limitation, the driver can overwrite the target parameter by generating a larger target parameter by using the input interface, in particular the brake pedal. According to another example, if the driver wants to accelerate more compared to the acceleration reached according to the target parameter or allowed by the target parameter due to a limitation, the driver can overwrite the target parameter by generating a larger target parameter by using the input interface, in particular the accelerator pedal. After using the driver input interface, in particular when the driver releases the brake pedal or the accelerator pedal, the method according to the invention may take over control again by generating and providing the target parameter as described above.

Preferably, the method comprises a further step, wherein at least one output information is sent to an output device, wherein the at least one output information comprises a notification and/or a warning and/or a control parameter for other vehicle systems. The output device may comprise an HMI for warning the driver acoustically, optically and/or haptically and informs the driver about a situation, in particular a safety critical situation, wherein he has to take over control of the vehicle again. Additionally or alternatively, the output device may inform the driver while the functionality of the method is active. Further, it is also possible to send information to other vehicle systems.

According to a further aspect of the invention, a device for carrying out the method as described above is provided, wherein the device comprises electronic data processing means configured to carry out the method, wherein the device is configured for attachment in a vehicle. For a person skilled in the art, it is clear that he can transfer embodiments of the above-described method analogously to configuration aspects of the device.

Preferably, the device comprises an interface configured to receive at least one environment-related information from an environment-related source. The environment related source may be configured as described above and may, according to a further aspect of the invention, be part of the device. Preferably, the interface comprises an electronic connection, whereby the at least one environment-related information may be received.

Preferably, the device comprises an interface configured to receive a driver input from a driver input interface. The driver input interface may be configured as described above and may, according to a further aspect of the invention, be part of the device. Preferably, the interface comprises an electronic connection, whereby the driver input may be received.

Preferably, the device comprises an interface configured to provide the target parameter, in particular to other systems of the vehicle, in particular via a data line, for example a BUS-connection. Preferably, the interface comprises an electronic connection, whereby the target parameter may be provided.

According to a further aspect of the invention, a vehicle, in particular a commercial vehicle, is provided. The vehicle is configured to carry out the method as described above or comprising a device as described above. In particular, the vehicle may be configured as a bus, a truck, or a combination of a towing vehicle and at least one trailer. For a person skilled in the art, it is clear that he can transfer embodiments of the above-described method analogously to configuration aspects of the vehicle.

According to a further aspect of the invention, a computer program product is provided. The computer program prod-uct comprises code means configured to carry out the method as described above when the code means are carried out on an electronic data processing means. The electronic data processing means is preferably the electronic data processing means of the device as described above.

According to a further aspect of the invention, a storage medium is provided. The storage medium comprises a computer program product as described above.

In the following, the invention is described by referring to the attached drawings.

Figure 1:
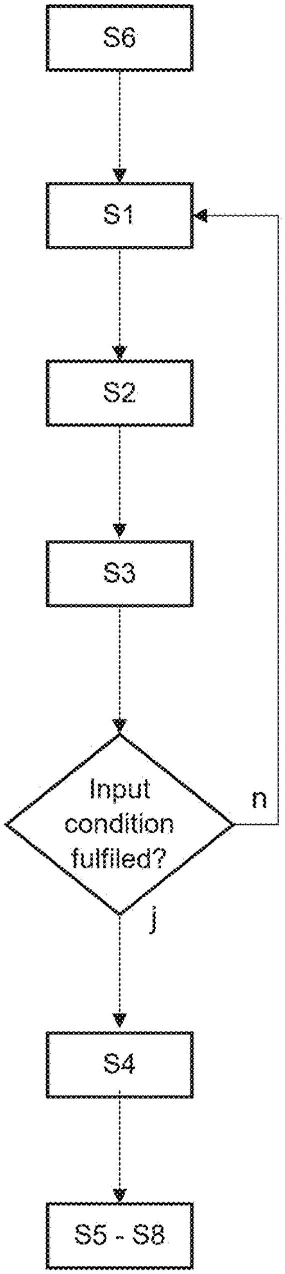
FIG. 1 shows a flowchart of a method according to the invention.

The method comprises the essential steps S1 to S4, wherein the further steps S5 to S8 are optional.

In step S1, at least one environment-related information from an environment-related source is received. This infor-mation may relate to objects the vehicle is heading to and must react to. As described above, this may be e.g. another vehicle or a stop sign.

In step S2, a driver input from a driver input interface is received. This may be, as described above, an accelerator pedal or a brake pedal or another input device. In the case of using an accelerator pedal or brake pedal or a correspond-ing input device, the driver may generate several driver inputs according to the pedal position. However, according to the invention, the driver must fulfil a predetermined input condition to carry out all essential steps S1 to S4 as described later.

According to step S3, a target parameter is generated for controlling the longitudinal movement according to the environment-related information. The target parameter comprises a target vehicle acceleration or a target vehicle deceleration and/or a target vehicle speed and/or a target propulsion torque or force or a target deceleration torque or force. The target parameter is used as an input value for movement control system, wherein the movement control system controls the movement of the vehicle, by trying to adjust the corresponding value according to the target parameter.

The at least one movement control system may comprise a deceleration system, in particular a brake system, a retarder, a recuperative deceleration system, and/or a propulsion system as it was described above.

Further, if the driver input fulfils a predetermined input condition, the target parameter is provided according to step S4. For example, the target parameter may be provided to a movement control system that is used according to step S5 for controlling the longitudinal movement of the vehicle according to the target parameter. The predetermined input condition is a tapping of the brake pedal by the driver, which preferably does not apply a brake effect on the vehicle, or the input condition may be a release, preferably a full release, of the accelerator pedal. Other predetermined input conditions are described above.

At the beginning of the method, a step S6 is shown wherein a control parameter from a control parameter source is received. The method is carried out according to the control parameter, wherein the control parameter comprises an activation parameter or a vehicle status information, preferably a status information from the at least one control system. According to the activation parameter that can be set by the driver or by the vehicle, in particular other vehicle systems as the movement control systems as described above, carrying out the whole method or at least step S4 may be suppressed or the functionality of the method according to the invention may be deactivated. This may be an option if the functionality of the method is used as a comfort function and not as a safety-relevant function.

According to a further step S7 a stop control parameter from a stop control parameter source is received, wherein at least carrying out step S4 is interrupted or set to a non-influence state to the at least one movement control system. That means, carrying out of the method may be stopped only by suppressing step S4 or even by suppressing or interrupting the steps S1 to S4. The stop control parameter source may comprise a deceleration monitoring unit configured to monitoring the deceleration of the vehicle during carrying out the method according to the invention. If the deceleration of the vehicle according to the target parameter is too low to reach a safe state or if the movement control system using the target parameter cannot apply a deceleration to the vehicle to reach a safe state, another movement control system, for example comprising a driver assistant system like AEBS, may continue the movement control of the vehicle or at least the generation of the target parameter. According to a further aspect, the stop control parameter source may comprise a driver input interface, for example the accelerator pedal or the brake pedal, whereby the driver can overwrite the target parameter provided in step S4.

Optionally, the method can further comprise a step S8, wherein at least one output information is sent to an output device, wherein the at least one output information comprises a warning and/or a control parameter. A warning can be acoustically, optically and/or haptically based and informs the driver about a situation, in particular a safety critical situation, wherein he has to take over control of the vehicle again. For example, if the deceleration achieved while approaching an object like a stop sign, a road crossing or a pedestrian, is not sufficient to stop before reaching this object, since the deceleration system only decelerates by using a recuperative deceleration system, wherein the electric storage of this system cannot store any more electric energy, the driver has to take over control after a warning via the output device and has to hit the brake pedal to decelerate using the friction brakes of the vehicle.

Figure 2:
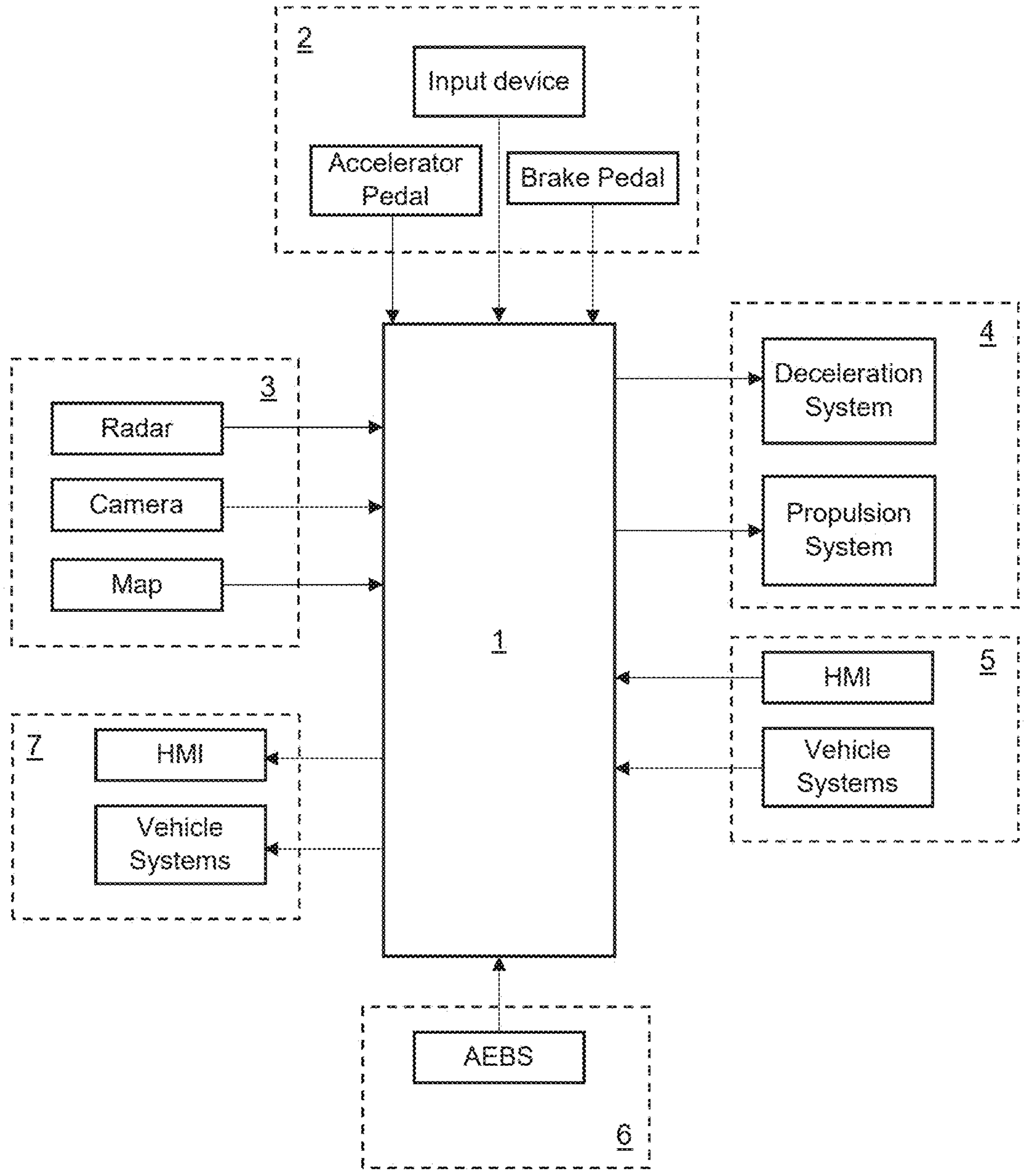
FIG. 2 shows a block diagram, wherein a device for carrying out the method is shown in connection to other elements of the vehicle.

FIG. 2 shows a block diagram, wherein a device for carrying out the method is shown in connection to other elements of the vehicle. All elements shown here by blocks may represent devices or in general hardware elements as described.

A device 1 is shown configured to carry out the method according to the invention.

The device 1 is in connection to a driver input interface 2. The driver input interface 2 comprises an accelerator pedal, a brake pedal and an input device. A driver can input a driver input according to step S1 of FIG. 1 by using one of these devices. The device 1 is configured to receive the driver input from the driver input interface 2 according to step S2 and to carry out the method accordingly.

The device 1 is further connected to an environment-related source 3, wherein at least one environment-related information is provided to the device 1. The environment-related source 3 comprises environment detection means, in particular a sensor and/or a receiver, as described above. The environment-related source 3 may alternatively or additionally comprise stored environment data as described above. By using the environment-related source 3 the device 1 can use the environment-related information for carrying out the method. As described above, the environment detection means may comprise an optical sensor, for example a radar sensor or a camera or a GPS-receiver configured to receive data to determine the position of the vehicle. Additionally or alternatively, the environment-related source comprises stored environment data like map data.

Further, the device 1 is connected to a movement control system 4 comprising as described above, a deceleration system and a propulsion system. After generating the target parameter according to step S3, the target parameter is provided by the device 1 according to step S4 to the movement control system 4 under the condition that a predetermined input condition is fulfilled by the driver input. That means, that the driver may activate at least the providing of the target parameter S4 actively. As described above, such a driver input may be the release of the accelerator pedal, a tapping of the brake pedal or a switching of an input device into a respective switching state.

Further, the device is connected to a control parameter source 5. The control parameter source 5 may comprise a HMI, whereby a driver can adjust a control parameter the device can receive according to step S6. Thereby, the driver can activate or deactivate the at least carrying out step S4 or carrying out the whole method by the device 1. In particular, when the method is configured as a comfort function, the driver has the possibility to deactivate this functionality. The HMI may be configured as described above. Further, the control parameter source 5 may also comprise other vehicle systems. For example, if the target parameter generated and provided by the device 1 to the movement control system is exclusively used for decelerating by recuperation, the control parameter source 5 sends an information to the device 1 if the electric energy storage is full so that recuperation cannot be carried out any more. In this case the execution of the method or at least step S4 is interrupted or deactivated by the device 1.

Further, the device 1 is connected to a stop control parameter source 6, wherein a stop control parameter is provided to the device 1. According to the stop control parameter, the device 1 stops at least carrying out the step S4 or sets the step S4 to a non-influence state to the at least one movement control system 4. The stop control parameter source 6 may be configured as described above. For example, the stop control parameter source 6 may comprise a driver assistant system like AEBS, a collision avoidance system or a driver assistant system (both not shown). These systems may overtake the movement control of the vehicle or at least the generation of the target parameter. Further, the stop control parameter source 6 may comprise a driver input interface, for example, the accelerator pedal and/or the brake pedal and/or another input device (all not shown) as described above.

Further, an output device 7 is connected to the device 1, wherein warnings or a status information are sent to the driver or other vehicle systems as described above.

The device 1 comprises electronic data processing means configured to carry out the method according to the invention, wherein the device 1 is configured for attachment in a vehicle.

In FIG. 2 a non-limiting embodiment of the invention is shown. According to other not shown embodiments, some of the elements shown in the drawing are not present or present in reduced form. For example, the movement control system 4 may only comprise a deceleration or a propulsion system. The control parameter source 5 may only comprise a HMI or just one or more vehicle systems. The environment-related source 3 may only comprise one or two of the shown elements. The output device 7 may only comprise a HMI or just one or more vehicle systems.

Figure 3:
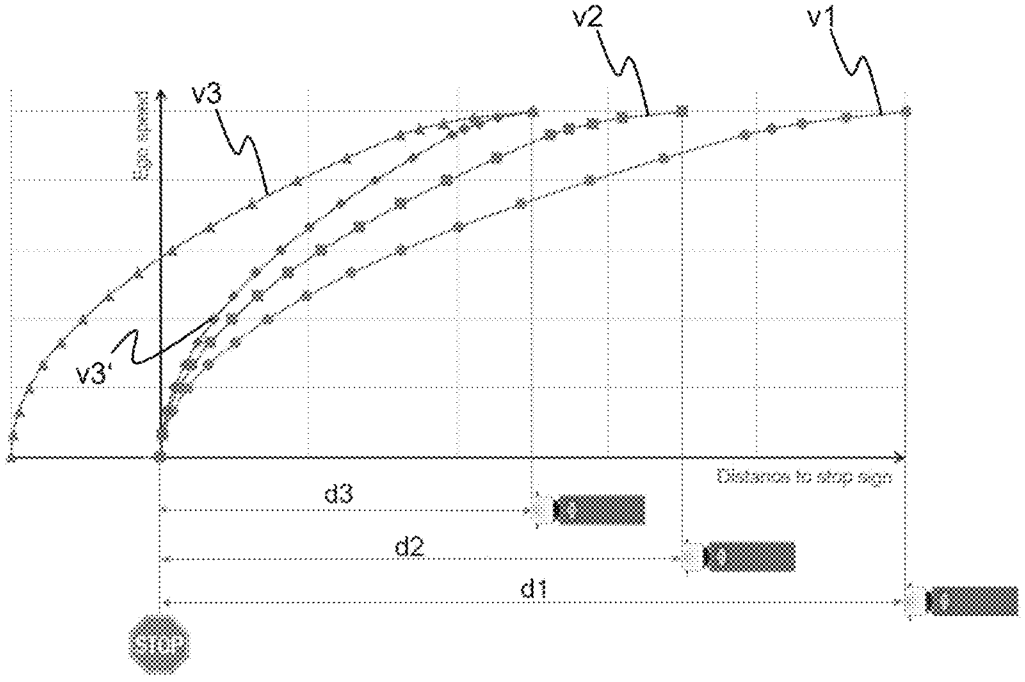
FIG. 3 shows deceleration curves of a vehicle, wherein the vehicle approaches a stop sign.

FIG. 3 shows deceleration curves of a vehicle, wherein the vehicle approaches a stop sign.

In the drawing, the vehicle is shown from above, approaching from the right to a stop sign. Three distances d1, d2, d3 are shown describing the distance between the vehicle and the stop sign when the driver input fulfils the predetermined input condition. According to step S1, the stop sign is recognized as an environment-related information from an environment-related source, for example a camera or map data. That means the target parameter according to step S3 is generated with the purpose to stop the vehicle safe at the stop sign. To fulfil the predetermined input condition, the driver taps on the brake pedal and/or releases the accelerator pedal or switches an input device into a corresponding switching state.

In this example, the target parameter generated according to step S3 is a target deceleration which leads to the velocity curves shown over the corresponding distances. Since in this example, the target deceleration generated in step S3 is limited to a maximum value, for example to provide a minimum comfort niveau for the driver or because only recuperative deceleration systems are used in this case, there is a minimum distance, from where the vehicle can stop only according to the target parameter generated according to step S3. If the method is started at a position closer to the stop sign as the minimum distance, a warning is output to the driver informing about this situation wherein the vehicle cannot stop at the stop sign according to the generated target parameter.

Starting from distance d1 is not safety critical. The vehicle can reduce its speed according to the velocity v1 and stopping at the stop sing is possible. Distance d2 is the minimum distance, from where the vehicle can stop only according to the target parameter generated according to step S3. That means, that the maximum target deceleration as target parameter is generated according to step S3 and the vehicle can still stop safely at the stop sign as it is shown by its velocity curve v2.

Starting form distance d3 which is smaller than d2, the maximum target parameter that can be generated according to step S3 is not sufficient to safely stop the vehicle at the stop sign as it is shown by the velocity curve v3 which is identical in shape to the velocity curve v2. Here, an information or warning is output to the driver according to step S8 informing the driver to intervene. By using the brake pedal, the driver can generate a higher target parameter or deactivate the functionality of the method according to the invention as described above. This may lead to a higher deceleration of the vehicle and to a safe stopping at the stop sign according to the velocity curve v3'.

LIST OF REFERENCE SIGNS

1 device
2 driver input interface
3 environment-related source
4 movement control system
5 control parameter source
6 stop control parameter source
7 output device
S1 to S8 method steps

The invention claimed is:

1. A method for controlling a vehicle, comprising:
receiving at least one environment-related information from an environment-related source;
receiving a driver input from a driver input interface;
wherein the driver input interface comprises a brake pedal;
generating a target parameter for controlling a longitudinal movement according to the environment-related information; and
providing a target parameter when the driver input fulfils a predetermined input condition;
wherein the target parameter comprises at least one of:
a target vehicle deceleration; a target deceleration torque; and a target deceleration force;
wherein the predetermined input condition is a predetermined brake pedal input.

2. The method according to claim 1, wherein the environment-related information comprises information about at least one object the vehicle approaches.

3. The method according to claim 2, further comprising:
performing a recognition of the at least one object; and/or performing a classification of the at least one object.

4. The method according to claim 2, wherein, the target parameter is generated to adjust at least one of a distance and a speed between the vehicle and the object.

5. The method according to claim 2, further comprising:
performing a recognition of a movement of the at least one object.

6. The method according to claim 5, further comprising:
performing a classification of the at least one object.

7. The method according to claim 1, further comprising:
controlling the longitudinal movement of the vehicle according to the target parameter by using at least one movement control system of the vehicle.

8. The method according to claim 7, wherein the at least one movement control system comprises a deceleration system.

9. The method according to claim 8, wherein the deceleration system comprises one or more of:

a brake system;

a retarder;

a recuperative deceleration system; and a propulsion system.

10. The method according to claim 1, wherein the environment-related source comprises at least one of an environment detection means sensor and stored environment data.

11. The method according to claim 10, wherein the environmental detection means comprises at least one of at least one sensor and at least one receiver.

12. The method according to claim 1, further comprising:

receiving a control parameter from a control parameter source, wherein the method is carried out according to the control parameter.

13. The method according to claim 12, wherein the control parameter comprises at least one of an activation parameter and a vehicle status information.

14. The method according to claim 1, further comprising:

receiving a stop control parameter from a stop control parameter source, wherein the providing the target parameter is interrupted; or setting at least one movement control system to a non-influence state.

15. The method according to claim 1, further comprising:

sending at least one output information to an output device, wherein the at least one output information comprises one or more of:

a notification, a warning, and a control parameter.

16. A non-transitory computer-readable memory having stored therein a computer program product configured to perform the method according to claim 1.

17. A device for controlling a vehicle, comprising:

an electronic data processor configured to:

receive at least one environment-related information from an environment-related source;

receive a driver input from a driver input interface, wherein the driver input comprises a brake pedal, generate a target parameter for controlling a longitudinal movement according to the environment-related information, wherein the target parameter comprises at least one of:

a target vehicle deceleration; a target deceleration torque; or a target deceleration force; and provide a target parameter when the driver input fulfils a predetermined input condition, wherein the predetermined input condition is a predetermined brake pedal input, wherein the device is configured for attachment in a vehicle.

18. A vehicle comprising the device according to claim 17.

* * * * *